Dec. 29, 1931.  S. JENCICK  1,838,627
AIR PUMPING DEVICE FOR USE WITH PNEUMATIC TIRES
Filed Oct. 20, 1928
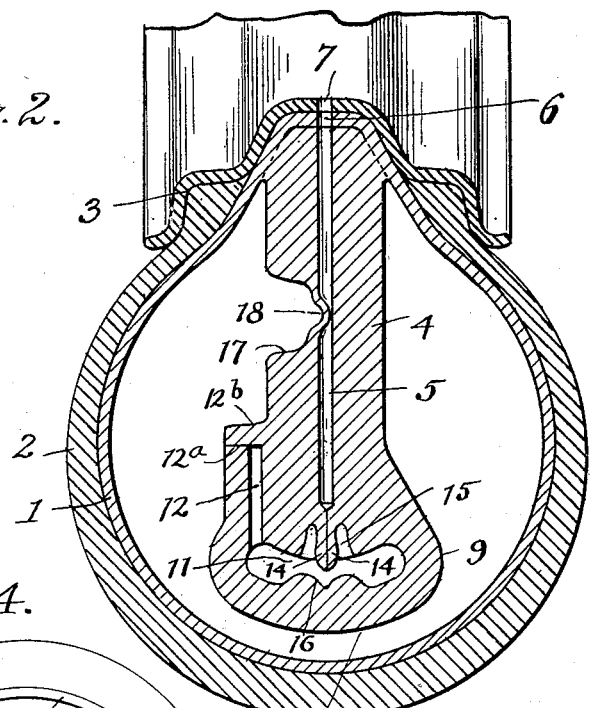
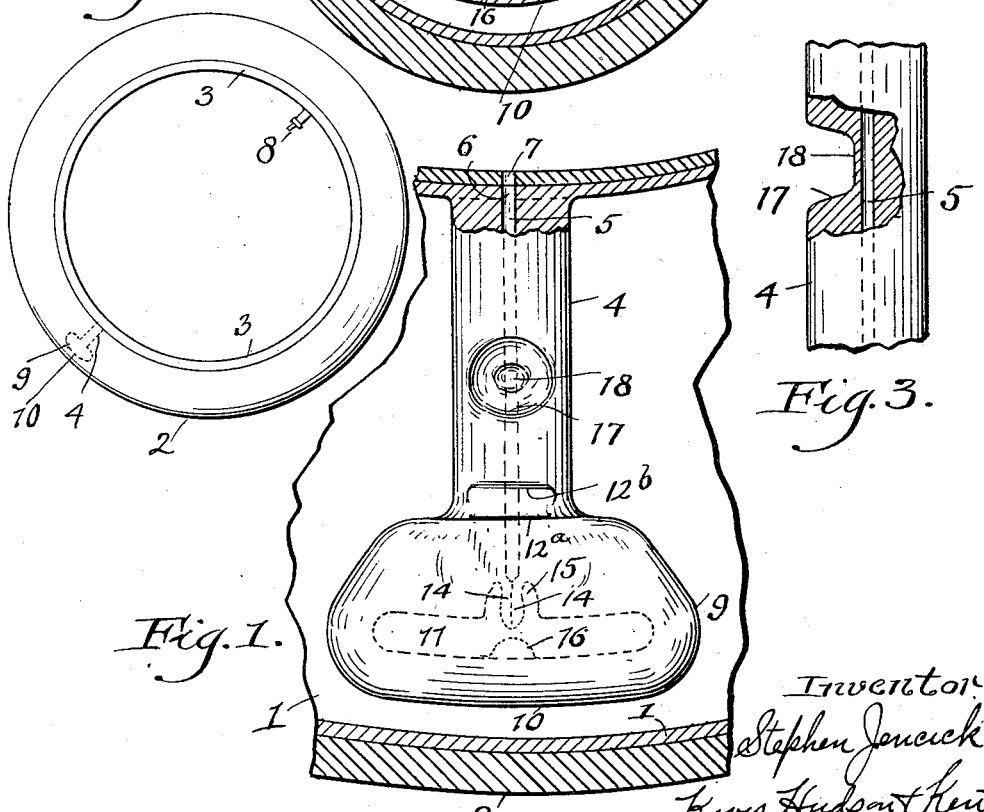

Patented Dec. 29, 1931

1,838,627

UNITED STATES PATENT OFFICE

STEPHEN JENCICK, OF CHAGRIN FALLS, OHIO

AIR PUMPING DEVICE FOR USE WITH PNEUMATIC TIRES

Application filed October 20, 1928. Serial No. 313,710.

This invention relates to a device adapted to be mounted within the inner tube of a pneumatic tire for the purpose of maintaining the air pressure within the inner tube at the predetermined proper or desired pressure.

One of the objects of the invention is to provide a device which will be automatically operated by the compression of the periphery of the tire as in use it rolls over the road.

A still further object of the invention is to produce a device which may be so mounted with respect to the valve stem and the parts associated therewith, and which is customarily used in connection with the inner tubes of tires so that there will be a balanced relation when the inner tube is mounted within a casing and the same is mounted upon the wheel of a vehicle.

A further object is to produce a device which will have a certain part thereof so fashioned as to be responsive to the pressure existing within the inner tube of a tire, so that when the pressure exceeds a predetermined amount the pumping device will become inoperative until the pressure within the tube becomes reduced.

Further objects will appear more at large as the invention proceeds.

Reference should be had to the accompanying drawings, forming a part of this specification, in which Figure 1 shows an elevation with portions in section of a part of a vehicle rim, tire casing and inner tube, and in elevation the device of the present invention.

Figure 2 is a sectional elevation taken at right angles to the showing in Figure 1.

Figure 3 is an elevation with portions in section of a part of the pumping device showing a detail of construction.

Figure 4 is an elevation of a tire casing mounted upon a rim and showing the relative position of the usual valve stem and the pumping device of the present invention.

It is a well known fact that tires for motor vehicles are only capable of giving the best results with respect to their action when used on a vehicle as well as their efficient wearing life is lengthened when the tires are maintained under a definite internal air pressure. The average person who owns an automobile is careless with respect to maintaining his tires at proper pressure, and in the majority of instances motor vehicles are operated with their tires under-inflated.

The situation is more important with respect to balloon tires, because they are intended to be used, comparatively speaking, under low air pressures, and when they are operated in under-inflated condition the walls of the casing, due to the weight of the vehicle upon which they are running, are caused to be bent or folded at a sharper angle than would be the case where the casing is used under fully inflated condition. This results in shortening the life of the casing.

I am aware that automatic inflation for inner tubes of tires has before been proposed, but so far as I am aware such proposals have been concerned with the mounting of a pumping device upon the valve stem of the inner tube, or mounting some pumping device upon the wheel of the vehicle and connecting it with the valve stem of the inner tube. These devices have, so far as I am aware, been unsuccessful.

In the construction which is herein shown and described the pumping device is mounted upon the interior of an inner tube, such as indicated at 1, and the inner tube is, of course, when used mounted within a casing 2, which is adapted to be mounted upon a rim 3 in the usual manner.

As before stated, within the inner tube the pumping device is mounted, and it comprises a body member 4 which, at its lower portion, is so shaped as to fit within the depressed portion of the inner tube when the same is mounted within a casing and on a standard form of rim. This is clearly illustrated in Figure 2 of the drawings. This body portion 4 is attached to the inner tube in any suitable manner, preferably by vulcanizing the two together.

The member 4 is provided with a centrally arranged air passage 5, and this passage at its lower end communicates with an opening 6 which is formed in the inner tube, and when the casing is mounted upon the rim 3 it will be so arranged that there will be an opening 7 formed in the rim 3 which will be properly positioned with respect to the opening 6 in the inner tube 1.

This may be readily brought about because of the fact that the pumping device is mounted within the inner tube at a diametrically opposite point with respect to the usual valve stem, which is indicated at 8 in Figure 4. The valve stem extends through a hole formed in the rim 3, and, therefore, the inner tube is definitely positioned with respect to the rim of the wheel. This being the case the pumping device may be definitely positioned with respect to the valve stem, and so insure that the opening 7 formed in the rim will be positioned properly with respect to the opening formed in the inner tube, which opening cooperates with the air passage 5.

It may also be mentioned that the mounting of the pumping device, so as to be diametrically opposite with respect to the valve stem 8, is purposeful in that it acts as a counter-balance for the valve stem and so in no way introduces any problems of unbalanced rotation.

The body portion 4 has at one end thereof what may be termed an enlarged head 9, which head is preferably formed with a rounding surface 10, so as to generally correspond with the contour of the inner surface of the inner tube. The relationship between the rounded portion 10 of the head and the inner periphery of the inner tube is such that when the tire, mounted upon a rim and upon a vehicle is given rotary motion as the vehicle moves forward the depression of the casing and the inner tube as that portion which is opposite the head 9 comes into contact with the road, will react upon the head 9 in a manner which will be later described.

Within the head 9 there is a chamber 11. This chamber communicates with a passageway 12, which is controlled by a suitable valve. In the present instance the valve control is provided by a lip valve formed by providing a portion 12b which is formed as a part of or joined with the main body portion 4, and engages with an off-set portion 12a of the body portion 4. The movement of the member 12b controls the passage of air through the passageway 12. Normally the pressure of air within the inner tube will hold the valve portion 12b in closed position, so that there will be no escape of air. However, it will be apparent that when air under higher pressure is caused to pass through the passageway 12 it will cause an opening movement of the member 12b to admit air within the inner tube.

The body portion 4 at that portion which communicates with the chamber 11 is formed with two lips, which are indicated at 14. These lip portions form a valve and are sufficiently resilient so that air may pass from the air passageway 5 into the chamber 11 at such times as there exists a subnormal pressure within the chamber 11. They will, however, be closed under other circumstances, because the lip members 14 are surrounded by a recess 15 which gives sufficient area upon the exterior surfaces of the lips 14 to develop enough pressure to normally hold the lips 14 tightly together.

The inner wall of the chamber 11 is formed with depending lobes 16, and these are so positioned that the space between the lobes comes directly above the lip members 14.

The operation of the device thus far described is as follows:

Assuming the device described is mounted within an inner tube and the inner tube mounted within a casing and the casing mounted upon a rim and upon a vehicle, the movement of the vehicle will cause the peripheral portion of the tire as successive portions come in contact with the ground, to be depressed, and when that portion of the casing which is opposite to the inflating device is depressed it will cause a depression of that portion of the pumping member which is adjacent to the inner tube, thereby collapsing the walls of the chamber 11 and forcing air through the valve mechanism 13 into the inner tube.

This will establish a subnormal pressure within the chamber 11, and as soon as the tire has further rotated the resiliency of the outer wall of the chamber 9 will tend to return the walls of the chamber 11 to their normal position and air will pass through the air passageway 5, past the lips 14 and into the chamber 11. Thus a continued rotation of the tire casing in its ordinary use upon a vehicle will effect a series of pumping actions which will force air into the inner tube.

In order to provide against over inflation any desired means may be employed which will be responsive to the pressure within the inner tube, and render the pumping device ineffective, so long as the excess pressure exists.

In the present instance I have provided a simple construction for accomplishing this result, which may be explained first by referring to Figure 3. The member 4 is shown as formed with a recess portion 17, thereby providing a comparatively thin inner wall 18, which is directly opposite the air duct 5. The thickness of the wall 18 may be determined by experimenting, and will be so constructed that when the air pressure within the inner tube exceeds a predetermined amount the wall 18 will be deflected so as to close the air duct or passageway 5. Obviously as long as the air duct 5 is closed the pumping action will not take place, but as soon as the presure within the inner tube 1 is sufficiently reduced to restore the wall 18 to its normal position, then the pumping action will be resumed.

It will be obvious that various changes may be made in the specific construction which had here been described without in any way departing from the spirit of the invention.

Having thus described my invention what I claim is:

1. The combination with a pneumatic tire, of a pumping device mounted therein, said device having a valve communication with the inside of the pneumatic tire and a valve communication with the atmosphere, an operating part of said pumping device being engaged by a portion of the tire when the same is depressed as it runs on the road to thereby effect an air pumping action, and means other than said second mentioned valve for shutting off the supply of air to said chamber when the pressure in the tire exceeds a predetermined amount.

2. The combination with a pneumatic tire, of a pumping device mounted therein, said device being provided with an air chamber which has a flexible wall, a valve air passageway connecting said chamber with the atmosphere and a valve passageway connecting said chamber with the inside of the tire, the said flexible wall being adapted to be engaged by a portion of the same when the same runs on the road to thereby effect a pumping action, and means for shutting off the supply of air to said first mentioned valve air passageway when the pressure in the tire exceeds a predetermined amount.

3. The combination with a pneumatic tire, of a pumping device mounted therein, said device being made of resilient material and being provided with an air chamber, said device having a duct which communicates with said chamber and the atmosphere, said duct having as a part thereof a flexible wall which is responsive to pressure within the tire and movable by said pressure to close the said duct, said device being provided with another duct connecting the said air chamber with the interior of the tire, valve means controlling the passage of air through said last mentioned duct, the said flexible wall of the air chamber being adapted to be engaged by a portion of the tire as it runs on the road to thereby effect a pumping action.

4. A pumping device adapted to be used in connection with pneumatic tires, comprising a body portion having a chamber provided with a flexible wall, said device having a duct communicating with the said air chamber and with the atmosphere, valve means controlling the passage of air through said duct, said device having a second duct communicating with the said air chamber and with the interior of the tire, valve means controlling the said duct, and means associated with the said body portion responsive to pressure within the said tire for controlling the said duct communicating with the air chamber and with the atmosphere.

In testimony whereof, I hereunto affix my signature.

STEPHEN JENCICK.